US010486477B2

(12) United States Patent
Balnis et al.

(10) Patent No.: US 10,486,477 B2
(45) Date of Patent: Nov. 26, 2019

(54) RUBBER COATING FOR ELECTRONIC COMMUNICATION MODULE, ELECTRONIC MODULE CONTAINING SAME, AND RELATED METHODS

(71) Applicant: Bridgestone Americas Tire Operations, LLC, Nashville, TN (US)

(72) Inventors: Craig R. Balnis, Aberdeen, NC (US); Paul B. Wilson, Tallmadge, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 15/770,553

(22) PCT Filed: Nov. 8, 2016

(86) PCT No.: PCT/US2016/060902
§ 371 (c)(1),
(2) Date: Apr. 24, 2018

(87) PCT Pub. No.: WO2017/083251
PCT Pub. Date: May 18, 2017

(65) Prior Publication Data
US 2019/0054781 A1  Feb. 21, 2019

Related U.S. Application Data

(60) Provisional application No. 62/252,616, filed on Nov. 9, 2015.

(51) Int. Cl.
| | | |
|---|---|---|
| B60C 23/04 | (2006.01) | |
| C09D 7/40 | (2018.01) | |
| C09D 107/00 | (2006.01) | |
| C08K 3/04 | (2006.01) | |
| C08L 9/00 | (2006.01) | |
| C09D 109/00 | (2006.01) | |
| C08K 3/22 | (2006.01) | |
| G06K 19/077 | (2006.01) | |
| C08K 3/08 | (2006.01) | |
| C08K 3/20 | (2006.01) | |

(52) U.S. Cl.
CPC ...... B60C 23/0452 (2013.01); B60C 23/0408 (2013.01); B60C 23/0493 (2013.01); C08K 3/04 (2013.01); C08K 3/08 (2013.01); C08K 3/20 (2013.01); C08K 3/22 (2013.01); C08L 9/00 (2013.01); C09D 7/67 (2018.01); C09D 107/00 (2013.01); C09D 109/00 (2013.01); G06K 19/07724 (2013.01); G06K 19/07728 (2013.01); G06K 19/07764 (2013.01)

(58) Field of Classification Search
CPC ...... B60C 23/0452; C09D 7/67; C09D 107/00
USPC ................................................. 152/152.1
See application file for complete search history.

(56) References Cited

U.S. PATENT DOCUMENTS

| | | |
|---|---|---|
| 5,387,480 A | 2/1995 | Haluska et al. |
| 5,426,147 A | 6/1995 | Laube et al. |
| 5,591,794 A | 1/1997 | Fukumoto et al. |
| 6,011,093 A | 1/2000 | Maly et al. |
| 6,144,106 A | 11/2000 | Bearinger et al. |
| 6,147,659 A | 11/2000 | Takahashi et al. |
| 6,329,915 B1 | 12/2001 | Brady et al. |
| 6,438,193 B1 | 8/2002 | Ko |
| 6,532,811 B2 | 3/2003 | Turner et al. |
| 6,546,982 B1 | 4/2003 | Brown et al. |
| 6,958,565 B1 | 10/2005 | Liu |
| 7,009,576 B2 | 3/2006 | Adamson et al. |
| 7,102,499 B2 | 9/2006 | Myatt |
| 7,492,328 B2 | 2/2009 | Kish et al. |
| 7,515,052 B2 | 4/2009 | Dixon et al. |
| 7,692,328 B2 | 4/2010 | Yoshida et al. |
| 7,916,033 B2 | 3/2011 | Westrick |
| 8,072,336 B2 | 12/2011 | Uehara et al. |
| 8,344,889 B2 | 1/2013 | Sands et al. |
| 8,511,355 B2 | 8/2013 | Kleckner |
| 8,743,006 B2 | 6/2014 | Yoshida et al. |
| 8,807,438 B2 | 8/2014 | Kikuchi et al. |
| 8,912,888 B2 | 12/2014 | Yoshida et al. |

(Continued)

FOREIGN PATENT DOCUMENTS

| | | |
|---|---|---|
| CN | 101826163 | 9/2010 |
| CN | 103183876 | 7/2013 |

(Continued)

OTHER PUBLICATIONS

Machine translation of KR101059589B1 published on Aug. 25, 2011 owned by Kumho Tire Co Ltd.
Machine translation of WO2014096684A1 published on Jun. 26, 2014 owned by Michelin & Cie [FR].
Machine translation of DE102012216576A1 published on May 28, 2014 owned by Bayerische Motoren Werke AG.
Machine translation of WO2009010642A2 published on Jan. 22, 2009 owned by Michelin Soc Tech [FR].

(Continued)

*Primary Examiner* — Lee Nguyen

(57) ABSTRACT

Disclosed herein is a rubber coating for an electronic communication module, the coating comprising 100 phr of at least one diene-based elastomer, and at least one nano-sized inorganic material having a dielectric constant of at least 9 and a loss tangent of less than 0.1, wherein the coating when cured has a dielectric constant of at least 4.5 and a loss tangent of less than 0.01. Also disclosed are an electronic communication module comprising a radio device having at least a portion of its outer surface surrounded by the rubber coating (i.e., a rubber composition of specified composition), tires or tire retreads incorporating the electronic communication module, and methods for increasing the dielectric constant of a rubber coating without increasing its loss tangent.

20 Claims, No Drawings

(56) References Cited

U.S. PATENT DOCUMENTS

| | | |
|---|---|---|
| 2002/0004549 A1 | 1/2002 | Custodero et al. |
| 2004/0140030 A1 | 7/2004 | Hahn et al. |
| 2004/0159383 A1 | 8/2004 | Adamson et al. |
| 2005/0059308 A1 | 3/2005 | Parsons |
| 2005/0257868 A1 | 11/2005 | Adamson |
| 2006/0186210 A1 | 8/2006 | Tethrake et al. |
| 2007/0007344 A1 | 1/2007 | Inoue et al. |
| 2007/0107824 A1 | 5/2007 | Hahn |
| 2007/0220963 A1 | 9/2007 | Morita et al. |
| 2008/0042851 A1 | 2/2008 | Baba et al. |
| 2008/0122704 A1 | 5/2008 | King |
| 2008/0275327 A1 | 11/2008 | Faarbaek et al. |
| 2009/0000718 A1 | 1/2009 | Rouckhout et al. |
| 2009/0015415 A1 | 1/2009 | Uehara et al. |
| 2009/0091455 A1 | 4/2009 | Baba et al. |
| 2009/0151828 A1 | 6/2009 | Zhao |
| 2009/0284375 A1 | 11/2009 | Kuo et al. |
| 2009/0322480 A1 | 12/2009 | Benedict |
| 2010/0032066 A1 | 2/2010 | Nakao et al. |
| 2010/0078487 A1 | 4/2010 | Baba et al. |
| 2010/0096181 A1 | 4/2010 | Nakamura et al. |
| 2010/0122757 A1 | 5/2010 | Lionetti |
| 2010/0134286 A1 | 6/2010 | Potyrailo et al. |
| 2010/0200816 A1 | 8/2010 | Oohira |
| 2010/0212791 A1* | 8/2010 | Incavo ............ B60C 23/0493 152/152.1 |
| 2010/0219252 A1 | 9/2010 | Kikuchi et al. |
| 2011/0000969 A1 | 1/2011 | Tucker |
| 2011/0198402 A1 | 8/2011 | Tucker |
| 2011/0210176 A1 | 9/2011 | King |
| 2011/0241836 A1 | 10/2011 | Yoshida et al. |
| 2013/0143018 A1 | 6/2013 | Tan et al. |
| 2013/0292023 A1 | 11/2013 | Bergman |
| 2014/0002242 A1 | 1/2014 | Fenkanyn |
| 2014/0178498 A1 | 6/2014 | Pratsinis et al. |
| 2014/0333492 A1 | 11/2014 | Battocchio |
| 2017/0368874 A1 | 12/2017 | Balnis et al. |
| 2017/0368875 A1 | 12/2017 | Balnis et al. |
| 2018/0009261 A1 | 1/2018 | Balnis et al. |

FOREIGN PATENT DOCUMENTS

| | | |
|---|---|---|
| CN | 103304855 | 9/2013 |
| CN | 103341941 | 9/2013 |
| DE | 102012216576 | 5/2014 |
| EP | 1580041 A1 | 9/2005 |
| EP | 1995082 A1 | 11/2008 |
| FR | 2918607 | 1/2009 |
| JP | 09118780 | 5/1997 |
| JP | 2004181984 | 7/2004 |
| JP | 2005015694 A | 1/2005 |
| JP | 2007009172 A | 1/2007 |
| JP | 2007230261 | 9/2007 |
| JP | 2008083792 | 4/2008 |
| JP | 2008291206 A | 12/2008 |
| JP | 2009096979 A | 5/2009 |
| JP | 2009298329 | 12/2009 |
| JP | 2010176453 A | 8/2010 |
| JP | 2010176454 | 8/2010 |
| JP | 2011162276 | 8/2011 |
| JP | 2013206045 | 10/2013 |
| KR | 20080046816 | 5/2008 |
| KR | 20090029450 | 3/2009 |
| KR | 20100120505 | 11/2010 |
| KR | 101059589 | 8/2011 |
| WO | 1999029523 | 6/1999 |
| WO | 2005021292 A1 | 3/2005 |
| WO | 2009010642 | 1/2009 |
| WO | 2007100111 A1 | 7/2009 |
| WO | 2010106302 | 9/2010 |
| WO | 2014096684 | 6/2014 |
| WO | 2012124577 A1 | 7/2014 |
| WO | 2016097257 | 6/2016 |
| WO | 2016105929 | 6/2016 |
| WO | 2016105937 | 6/2016 |
| WO | 2016105938 | 6/2016 |

OTHER PUBLICATIONS

Machine translation of FR2918607A1 published on Jan. 16, 2009 owned by Michelin Soc Tech [FR].
Machine translation of CN103183876A published on Jul. 3, 2013 owned by Qingdao Boyute Rubber Plastic Product Co Ltd.
Abstract of Flexible and stretchable UHF RFID tag antennas authored by Shuai Shao presented on Jun. 11, 2014 in Hague, Netherlands accessible via http://ieeexplore.ieee.org/xpl/articleDetails.jsp?arnumber=6902434.
Power transmission of uhf passive embedded authored by Shenbo Hu published on Feb. 17, 2014 in Guiyang, China.
Abstract of transmission performance for UHF embedded RFID system in tire authored by Shenbo Hu published on Oct. 24, 2013 accessible via http://d.wanfangdata.com.cn/Periodical_nygcxb201321019.aspx.
Abstract of Determining the dielectric properties of a car tire for an advanced tire monitoring system authored by Jasmin Grosinger published on Sep. 20, 2009 accessible via http://ieeexplore.ieee.org/xpl/articleDetails.jsp?arnumber=5379069.
Embedded UHF RFID tag antennas for automotive tire sensing authored by Shuai Shao published on Jul. 2013 accessible via http://search.proquest.com/docview/1565712955?accountid=142944.
Abstract of Broadband and flexible textile RFID tags for tires authored by Shuai Shao presented on Jul. 6, 2014 accessible via https://ieeexplore.ieee.org/abstract/document/6905079.
Abstract of Flexible 0-3 ceramic-polymer composites of barium titanate and epoxidized natural rubber authored by Subhan Salaeh published on Jun. 27, 2013 accessible via http://onlinelibrary.wiley.com/doi/10.1111/ijac.12129/abstract;sessionid=5BA95609D3F46EE3F02861AC8BC427F4.f04t03.
Machine translation of JP2007230261A published on Sep. 13, 2007 owned by Yokohoma Rubber Co Ltd.
Machine translation of KR20080046816A published on May 28, 2008 owned by Hankook Tire Co Ltd.
Machine translation of JP2010176454 published on Aug. 12, 2010 owned by Crown Cork Japan.
Machine translation of KR20100120505 published on Nov. 16, 2010 owned by Kumho Tire Co Inc.
Machine translation of JP2011162276A published on Aug. 25, 2011 owned by Bridgestone Corp.
Machine translation of JP2008083792A published on Apr. 10, 2008 owned by Hitachi Information Sys Ltd.
Machine translation of KR20090029450A published on Mar. 23, 2009 owned by Kolon Inc.
Machine translation of CN101826163 published on Sep. 8, 2010 owned by Tatwah Smartech Co Ltd.
Machine translation of JP2013206045A published on Oct. 7, 2013 owned by Tokai Rubber Ind Ltd.
Machine translation of JP2009298329A published on Dec. 24, 2009 owned by Bridgestone Corp.
Machine translation of JP2004181984A published on Jul. 2, 2004 owned by Bridgestone Corp.
Abstract of Design of a passive RFID tag antenna at 2.45 GHz for mounting on various platforms authored by Rafiqul Islam presented on Dec. 12, 2011 accessible via https://ieeexplore.ieee.org/document/6168752.
Power transmission performance for ultra high frequency embedded RFID system in tire authored by Shengbo Hu published on Nov. 1, 2013.
ISR/WO (PCT/US2015/064495) conducted by Joong Sub Han on Apr. 20, 2016 under the Korean Intellectual Property Office.
ISR/WO (PCT/US2015/064582) conducted by Joong Sub Han on Apr. 20, 2016 under the Korean Intellectual Property Office.
ISR/WO (PCT/US2015/064581) conducted by Joong Sub Han on Apr. 20, 2016 under the Korean Intellectual Property Office.
Machine translation of JPH09118780A published on May 6, 1997 owned by Yokohoma Rubber Co Ltd.

(56) References Cited

OTHER PUBLICATIONS

Wei, T. et al., Read Range Sensitivity of Embedded RFID Tags in Tires, presented at Sep. 2015 meeting of the Tire Society.
Wei, T. et al.,Powerpoint slides accompanying presentation at Sep. 2015 meeting.
ISA/WO (PCT/US2016/060902) conducted by Dong Wook Lee on Feb. 22, 2017 under the Korean Intellectual Property Office.
Supplementary European Search Report/Opinion for European Patent Application No. EP15874104 completed by Graham Russel on Jun. 14, 2018 in Munich, Germany.
Machine translation of WO2016097257 published on Jun. 23, 2016 owned by Michelin Rech Tech.
Supplementary European Search Report/Opinion for European Patent Application No. EP15874097 completed by Graham Russell on Jun. 13, 2018 in Munich, Germany.
Machine translation of CN103341941 published on Sep. 10, 2013 owned by Xiamen Autotop Technology Corp.
Machine translation of CN103304855 published on Sep. 18, 2013 owned by Xiamen Autotop Technology Corp.
Supplementary European Search Report/Opinion for European Patent Application No. EP15874105 completed by Graham Russell on Jun. 15, 2018 in Munich, Germany.
Karl Billen, Extended European Search Report, dated May 8, 2019, pp. 1-7, European Patent Office, Munich, Germany.
Machine translation of JP2008291206A published on Dec. 4, 2008 owned by NTN Toyo Bearing Co Ltd.
Machine translation of JP2010176453A published on Aug. 12, 2010 owned by Crown Cork Japan.
Machine translation of WO2005021292A1 published on Mar. 10, 2005 owned by Omron Tateisi Electronics Co.
Machine translation of WO2012124577A1 published on Jul. 24, 2014 owned by Nitta Corp.
Machine translation of JP2009096979A published on May 7, 2009 owned by Ntn Toyo Bearing Co. Ltd.
Machine translation of JP2007009172 published on Jan. 18, 2007 owned by Sekisui Chemcial Co. Ltd.
Machine translation of JP2005015694A published on Jan. 20, 2005 owned by Asahi Glass Co. Ltd.

\* cited by examiner

RUBBER COATING FOR ELECTRONIC COMMUNICATION MODULE, ELECTRONIC MODULE CONTAINING SAME, AND RELATED METHODS

FIELD

The present application is directed to a rubber coating for an electronic communication module such as is suitable for incorporating into a tire, an electronic communication module comprising a radio device having at least a portion of its outer surface surrounded by the rubber coating, a tire or tire retread containing the electronic communication module, and related methods.

BACKGROUND

Electronic devices integrated in a tire can provide functions such as identification and tracking during manufacture, distribution, and use of a tire. Such devices can also function to monitor physical parameters such as pressure and temperature during use of the tire. Tire identification and monitoring devices may be passive or active depending on design and desired functions.

One type of known tire identification (or tracking) device stores a unique identification number that may be read by a remote device that obtains the information from the tire identification device. Tire manufacturers may wish to incorporate a tire identification device into each tire manufactured so that the tire may be tracked during the manufacturing process and during subsequent use on vehicles.

Tire monitoring devices may be configured to read operating conditions of the tire and transmit the information from the tire to an outside reader. Such devices may be useful to trigger alarms when certain operating conditions are met (e.g., the pressure of the tire is too low). These monitoring devices may also be configured to store the information for later retrieval.

Given the wide variety of available identification and monitoring devices, a wide variety of mounting configurations also exist for these devices. Exemplary known mounting configurations include incorporating the monitoring device into a tire sidewall, incorporating the monitoring device into the bead filler, attaching the device with a patch or adhesive to the tire sidewall, attaching the device directly to the innerliner with a patch or an adhesive, connecting the device to the rim that supports the tire, and mounting the device to the valve stem of the wheel.

SUMMARY

Disclosed herein are a rubber coating for an electronic communication module, and an electronic communication module comprising a radio device having at least a portion of its outer surface surrounded by the rubber coating (i.e., a rubber composition of specified composition). Also disclosed are tires or tire retreads incorporating the electronic communication module. Additionally disclosed are methods for increasing the dielectric constant of a rubber coating without increasing its loss tangent.

In a first embodiment, a rubber coating for an electronic communication module is disclosed. The rubber coating comprises (a) 100 phr of at least one diene-based elastomer; (b) at least one nano-sized inorganic material having a dielectric constant of at least 9 and a loss tangent of less than 0.1; wherein the coating when cured has a dielectric constant of at least 4.5 and a loss tangent of less than 0.01.

In a second embodiment, an electronic communication module for a tire is disclosed. The electronic communication module comprises a radio device having at least a portion of its outer surface surrounded by the rubber coating of the first embodiment, i.e., a rubber coating comprising (a) 100 phr of at least one diene-based elastomer; (b) at least one nano-sized inorganic material having a dielectric constant of at least 9 and a loss tangent of less than 0.1; wherein the coating when cured has a dielectric constant of at least 4.5 and a loss tangent of less than 0.01.

In a third embodiment, a tire or tire retread comprising the electronic communication module of the second embodiment is disclosed, i.e., an electronic communication module comprising a radio device having at least a portion of its outer surface surrounded by the rubber coating of the first embodiment, i.e., a rubber coating comprising (a) 100 phr of at least one diene-based elastomer; (b) at least one nano-sized inorganic material having a dielectric constant of at least 9 and a loss tangent of less than 0.1; wherein the coating when cured has a dielectric constant of at least 4.5 and a loss tangent of less than 0.01.

In a fourth embodiment, a method for increasing the dielectric constant of a rubber coating without increasing its loss tangent is disclosed. The method comprises incorporating at least one nano-sized inorganic material having a dielectric constant of at least 9 and a loss tangent of less than 0.1 into 100 phr of at least one diene-based elastomer such that the resulting rubber coating when cured has a dielectric constant of at least 4.5 and a loss tangent of less than 0.01.

DETAILED DESCRIPTION

Disclosed herein are a rubber coating for an electronic communication module (the electronic communication module being one such as is suitable for incorporating into a tire), and an electronic communication module comprising a radio device having at least a portion of its outer surface surrounded by the rubber coating (i.e., a rubber composition of specified composition). Also disclosed are tires or tire retreads incorporating the electronic communication module. Additionally disclosed are methods for increasing the dielectric constant of a rubber coating without increasing its loss tangent.

In a first embodiment, a rubber coating for an electronic communication module is disclosed. The rubber coating comprises (a) 100 phr of at least one diene-based elastomer; (b) at least one nano-sized inorganic material having a dielectric constant of at least 9 and a loss tangent of less than 0.1; wherein the coating when cured has a dielectric constant of at least 4.5 and a loss tangent of less than 0.01.

In a second embodiment, an electronic communication module for a tire is disclosed. The electronic communication module comprises a radio device having at least a portion of its outer surface surrounded by the rubber coating of the first embodiment, i.e., a rubber coating comprising (a) 100 phr of at least one diene-based elastomer; (b) at least one nano-sized inorganic material having a dielectric constant of at least 9 and a loss tangent of less than 0.1; wherein the coating when cured has a dielectric constant of at least 4.5 and a loss tangent of less than 0.01.

In a third embodiment, a tire or tire retread comprising the electronic communication module of the second embodiment is disclosed, i.e., an electronic communication module comprising a radio device having at least a portion of its outer surface surrounded by the rubber coating of the first embodiment, i.e., a rubber coating comprising (a) 100 phr of at least one diene-based elastomer; (b) at least one nano-sized inorganic material having a dielectric constant of at least 9 and a loss tangent of less than 0.1; wherein the coating when cured has a dielectric constant of at least 4.5 and a loss tangent of less than 0.01.

In a fourth embodiment, a method for increasing the dielectric constant of a rubber coating without increasing its loss tangent is disclosed. The method comprises incorporating at least one nano-sized inorganic material having a dielectric constant of at least 9 and a loss tangent of less than 0.1 into 100 phr of at least one diene-based elastomer such that the resulting rubber coating when cured has a dielectric constant of at least 4.5 and a loss tangent of less than 0.01.

Definitions

The terminology as set forth herein is for description of the embodiments only and should not be construed as limiting the invention as a whole.

As used herein, "DBP" refers to dibutyl phthalate.

As used herein, "DBP absorption" refers to the dibutyl phthalate absorption test used to determine the structure of carbon black. The DBP absorption can be determined by various standard methods, including the method mentioned herein.

As used herein, "nano-sized" such as used in the phrase "nano-sized inorganic material" refers to a material having an average primary particle size (in at least one dimension) in the nanometer range which should be understood to encompass values from 100 nm and less, preferably 100 nm to 1 nm.

As used herein, the term "natural rubber" means naturally occurring rubber such as can be harvested from sources such as Hevea rubber trees and non-Hevea sources (e.g., guayule shrubs and dandelions such as TKS). In other words, the term "natural rubber" should be construed so as to exclude synthetic polyisoprene.

As used herein, "nitrogen surface area" refers to the nitrogen absorption specific surface area ($N_2SA$) of a particulate material, including but not limited to the carbon black and "non-reinforcing fillers" of particulate material discussed herein. The nitrogen surface area can be determined by various standard methods including those mentioned below.

As used herein, the term "phr" means parts per one hundred parts rubber. The 100 parts rubber refers to 100 parts of the at least one diene based elastomer.

As used herein the term "polyisoprene" means synthetic polyisoprene. In other words, the term is used to indicate a polymer that is manufactured from isoprene monomers, and should not be construed as including naturally occurring rubber (e.g., Hevea natural rubber, guayule-sourced natural rubber, or dandelion-sourced natural rubber). However, the term polyisoprene should be construed as including polyisoprenes manufactured from natural sources of isoprene monomer.

As used herein the terms "relative permittivity" and "dielectric constant" of a material are intended to have the same meaning and are used interchangeably to refer to the ratio of the dielectric permittivity of a material to the permittivity of a vacuum. Unless otherwise indicated, the dielectric constant values disclosed herein refer to those of a cured form of the rubber coating.

Rubber Coating

As discussed above, the first embodiment disclosed herein is directed to a rubber coating for an electronic communication module. The electronic communication module can be understood to be one that is suitable for incorporating into a tire. As also discussed above, the second embodiment disclosed herein is directed to an electronic communication module for a tire comprising a radio device having at least a portion of its outer surface surrounded by the rubber coating of the first embodiment; the third embodiment disclosed herein is directed to a tire or tire retread comprising the electronic communication module of the second embodiment disclosed herein, i.e., an electronic communication module comprising a radio device having at least a portion of its outer surface surrounded by the rubber coating of the first embodiment; and the fourth embodiment disclosed herein is directed to a method for increasing the dielectric constant of a rubber coating without increasing its loss tangent which comprises incorporating at least one nano-sized inorganic material having a dielectric constant of at least 9 and a loss tangent of less than 0.1 into 100 phr of at least one diene-based elastomer such that the resulting rubber coating when cured has a dielectric constant of at least 4.5 and a loss tangent of less than 0.01. Thus, each of the first-fourth embodiments disclosed herein incorporates or utilizes a rubber coating. All discussion of the rubber coating and its component ingredients provided herein should be understood to apply equally to each of the first-fourth embodiments unless indicated to the contrary.

The rubber coating of the first-fourth embodiments disclosed herein comprises (a) 100 phr of at least one diene-based elastomer; and (b) at least one nano-sized inorganic material having a dielectric constant of at least 9 and a loss tangent of less than 0.1; wherein the coating when cured has a dielectric constant of at least 4.5 and a loss tangent of less than 0.01. The at least one diene-based elastomer and at least one nano-sized inorganic material are discussed in more detail below.

As discussed above, according to the first-fourth embodiments, the dielectric constant of the rubber coating when cured is at least 4.5 and its loss tangent is less than 0.01. In certain embodiments of the first-fourth embodiments, the dielectric constant of the rubber coating is 4.5 to about 40, including 4.5 to 40, 4.5 to about 30, 4.5 to 30, 4.5 to about 20, 4.5 to 20, 4.5 to about 10, 4.5 to 10, 4.5 to about 9, 4.5 to 9, 4.5 to about 8, 4.5 to 8, 4.5 to about 7, 4.5 to 7, 4.5 to about 6, 4.5 to 6, 4.5 to about 5.5, 4.5 to 5.5, 4.5 to about 5 and 4.5 to 5. In certain embodiments of the first-fourth embodiments, the loss tangent of the rubber coating is about 0.0001 to 0.01, including 0.0001 to 0.01, about 0.0001 to about 0.009, 0.0001 to 0.009, about 0.0001 to about 0.008, 0.0001 to 0.008, about 0.0002 to 0.01, 0.0002 to 0.01, about 0.0002 to about 0.009, 0.0002 to 0.009, about 0.0002 to about 0.008, 0.0002 to 0.008, about 0.0003 to 0.01, 0.0003 to 0.01, about 0.0003 to about 0.009, 0.0003 to 0.009, about 0.0003 to about 0.008, 0.0003 to 0.008, about 0.0004 to 0.01, 0.0004 to 0.01, about 0.0004 to about 0.009, 0.0004 to 0.009, about 0.0004 to about 0.008, 0.0004 to 0.008, about 0.0005 to 0.01, 0.0005 to 0.01, about 0.0005 to about 0.009, 0.0005 to 0.009, about 0.0005 to about 0.008, 0.0005 to 0.008, about 0.0006 to 0.01, 0.0006 to 0.01, about 0.0006 to about 0.009, 0.0006 to 0.009, about 0.0006 to about 0.008, 0.0006 to 0.008, about 0.0007 to 0.01, 0.0007 to 0.01, about 0.0007 to about 0.009, 0.0007 to 0.009, about 0.0007 to about 0.008, 0.0007 to 0.008, about 0.0008 to 0.01, 0.0008 to 0.01, about 0.0008 to about 0.009, 0.0008 to 0.009, about 0.0008 to about 0.008, 0.0008 to 0.008, about 0.0009 to 0.01, 0.0009 to 0.01, about 0.0009 to about 0.009, 0.0009 to 0.009, about 0.0009 to about 0.008, and 0.0009 to 0.008. According to certain embodiments of the first-fourth embodiments disclosed herein, the rubber coating may have a loss tangent selected from one of the foregoing ranges combined with any of the dielectric constant ranges previously provided, or a dielectric constant selected from one of the foregoing ranges combined with any of the loss tangent ranges previously provided.

According to the first-fourth embodiments, the thickness of the rubber coating may vary. In certain embodiments of the first-fourth embodiments, the thickness of the rubber coating, e.g., of the rubber coating that surrounds at least a portion of a radio device of an electronic communication module for a tire, is no more than 4 mm. In certain embodiments of the first-fourth embodiments, the thickness of the rubber coating, e.g., of the rubber coating that surrounds at least a portion of a radio device of an electronic communication module for a tire, is at least 0.5 mm. In certain embodiments of the first-fourth embodiments, the thickness of the rubber coating, e.g., of the rubber coating that surrounds at least a portion of a radio device of an electronic communication module for a tire, ranges from about 0.5 to about 4 mm, including 0.5 to 4 mm, about 0.5 to about 3.5 mm, 0.5 to 3.5 mm, about 0.5 to about 3 mm, 0.5 to 3 mm, about 0.5 to about 2.5 mm, 0.5 to 2.5 mm, about 0.5 to about 2 mm, 0.5 to 2 mm, about 0.5 to about 1.5 mm, 05 to 1.5 mm, about 1 to about 4 mm, 1 to 4 mm, about 1 to about 3.5 mm, 1 to 3.5 mm, about 1 to about 3 mm, 1 to 3 mm, about 1 to about 2.5 mm, 1 to 2.5 mm, about 1 to about 2 mm, 1 to 2 mm, about 1.5 to about 4 mm, including 1.5 to 4 mm, about 1.5 to about 3.5 mm, 1.5 to 3.5 mm, about 1.5 to about 3 mm, 1.5 to 3 mm, about 1.5 to about 2.5 mm, 1.5 to 2.5 mm, about 1.5 to about 2 mm, 1.5 to 2 mm, about 2 to about 4 mm, including 2 to 4 mm, about 2 to about 3.5 mm, 2 to 3.5 mm, about 2 to about 3 mm, 2 to 3 mm, about 2 to about 2.5 mm, and 2 to 2.5 mm.

When a radio device of an electronic communication module is incorporated into a tire or tire retread, the thickness of the rubber coating that surrounds at least a portion of the outer surface of the radio device should be understood to refer to the rubber coating that is applied to the radio device, although it should be understood that the rubber coated radio device may be surrounded by additional rubber (e.g., of the tire or tire retread) that may differ in composition from the composition of the rubber coating. The thickness of the rubber coating as specified above is not intended to include any such additional rubber that may surround the rubber coated radio device when it is incorporated into a tire or tire retread.

Diene-Based Elastomer

As discussed above, according to the first-fourth embodiments, the rubber coating comprises (includes) 100 phr of at least one diene-based elastomer. The foregoing rubber coating can also be understood as containing 100 parts of the at least one diene-based elastomer. As used herein, the term "diene-based elastomer" refers to a diene-monomer containing polymer, copolymer, or combination thereof (i.e., more than one polymer, more than one copolymer, one polymer and one copolymer, more than one polymer and one copolymer, more than one copolymer and one polymer, or more than one copolymer and more than one polymer). In accordance with certain embodiments according to the first-fourth embodiments, the at least one diene-based elastomer includes a diene-monomer containing polymer, copolymer, or combination thereof derived from, for example, the polymerization of one or more of the following conjugated diene monomers: 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and derivatives thereof. It should be understood that mixtures of two or more conjugated diene monomers may be utilized in certain embodiments. Non-limiting examples of suitable diene-based elastomers for use in the rubber coatings according to certain embodiments of the first-fourth embodiments disclosed herein include, but are not limited to, at least one of styrene-butadiene rubber (also referred to as SBR or styrene-butadiene copolymer), polybutadiene, natural rubber, ethylene propylene diene monomer rubber (also known as EPDM rubber), butyl rubber, neoprene, or polyisoprene. In certain embodiments of the first-fourth embodiments disclosed herein styrene-butadiene copolymer can be understood to mean a copolymer of styrene and butadiene monomers without any other monomers. In certain embodiments of the first-fourth embodiments disclosed herein, polybutadiene can be understood to mean a homopolymer of butadiene monomers (e.g., 1,3-butadiene); in certain such embodiments, the polybutadiene has a cis bond content of at least 80%, more preferably at least 90%, at least 92% or at least 95%. In certain embodiments of the first-fourth embodiment disclosed herein, polyisoprene can be understood to mean a homopolymer of isoprene monomers.

In certain embodiments according to the first-fourth embodiments disclosed herein, the at least one diene-based elastomer of the rubber coating, particularly styrene-butadiene types of diene-based elastomers, may comprise a functionalized diene-based elastomer. As used herein, the term "functionalized diene-based elastomer" should be understood to include elastomers with a functional group at one or both terminus (e.g., from use of a functionalized initiator, a functionalized terminator, or both), a functional group in the main chain of the elastomer, and combinations thereof. For example, a silica-reactive functionalized elastomer may have the functional group at one or both terminus, in the main chain thereof, or both. In certain such embodiments, the rubber coating comprises about 5 to 100 phr of at least one functionalized diene-based elastomer, including 5 to 100 phr, about 5 to about 90 phr, 5 to 90 phr, about 5 to about 70 phr, 5 to 70 phr, about 5 to about 50 phr, 5 to 50 phr, about 5 to about 40 phr, 5 to 40 phr, about 5 to about 30 phr, 5 to 30 phr, about 10 to about 90 phr, 10 to 90 phr, about 10 to about 70 phr, 10 to 70 phr, about 10 to about 50 phr, 10 to 50 phr, about 10 to about 40 phr, 10 to 40 phr, about 10 to about 30 phr, and 10 to 30 phr. In certain embodiments according to the first-fourth embodiments disclosed herein, the functionalized diene-based elastomer comprises a diene-based elastomer with a silica-reactive functional group. Non-limiting examples of silica-reactive functional groups that are known to be utilized in functionalizing diene-based elastomers and that are suitable for use in the rubber coatings of certain embodiments of the first-fourth embodiments include nitrogen-containing functional groups, silicon-containing functional groups, oxygen- or sulfur-containing functional groups, and metal-containing functional groups.

Non-limiting examples of nitrogen-containing functional groups that are known to be utilized in functionalizing diene-based elastomers include, but are not limited to, any of a substituted or unsubstituted amino group, an amide residue, an isocyanate group, an imidazolyl group, an indolyl group, a nitrile group, a pyridyl group, and a ketimine group. The foregoing substituted or unsubstituted amino group should be understood to include a primary alkylamine, a secondary alkylamine, or a cyclic amine, and an amino group derived from a substituted or unsubstituted imine. In certain embodiments according to the first-fourth embodiments disclosed herein, the rubber coating comprises a functionalized diene-based elastomer having at least one functional group selected from the foregoing list of nitrogen-containing functional groups.

Non-limiting examples of silicon-containing functional groups that are known to be utilized in functionalizing diene-based elastomers include, but are not limited to, an organic silyl or siloxy group, and more precisely, the functional group may be selected from an alkoxysilyl group, an alkylhalosilyl group, a siloxy group, an alkylaminosilyl group, and an alkoxyhalosilyl group. Suitable silicon-containing functional groups for use in functionalizing diene-based elastomer also include those disclosed in U.S. Pat. No. 6,369,167, the entire disclosure of which is herein incorporated by reference. In certain embodiments according to the first-fourth embodiments disclosed herein, the rubber coating comprises a functionalized diene-based elastomer having at least one functional group selected from the foregoing list of silicon-containing functional groups.

Non-limiting examples of oxygen- or sulfur-containing functional groups that are known to be utilized in functionalizing diene-based elastomers include, but are not limited to, a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thioester group, a thioaldehyde group, a thioalkoxy group, and a thioketone group. In certain embodiments, the foregoing alkoxy group may be an alcohol-derived alkoxy group derived from a benzophenone. In certain embodiments according to the first-fourth embodiments disclosed herein, the rubber coating comprises a functionalized diene-based elastomer having at least one functional group selected from the foregoing list of oxygen- or sulfur-containing functional groups.

Generally, diene-based elastomers may be prepared and recovered according to various suitable methods such as batch, semi-continuous, or continuous operations, as are well known to those having skill in the art. The polymerization can also be carried out in a number of different polymerization reactor systems, including but not limited to bulk polymerization, vapor phase polymerization, solution polymerization, suspension polymerization, coordination polymerization, and emulsion polymerization. The polymerization may be carried out using a free radical mechanism, an anionic mechanism, a cationic mechanism, or a coordination mechanism. All of the above polymerization methods are well known to persons skilled in the art.

Optionally, the rubber coating according to the first-fourth embodiments disclosed herein may further comprise up to about 20 phr (including up to 20 phr) of a silicone rubber elastomer. That is in certain embodiments, in addition to the 100 phr (or 100 parts) of the at least one diene based elastomer, the rubber coating comprises contains up to about 20 phr of a silicone rubber elastomer, including up to 20 phr, including from 0 to about 20 phr, including 0 to 20 phr, including from about 5 phr to about 20 phr, including 5 phr to 20 phr, including from about 5 phr to about 15 phr, including 5 phr to 15 phr, including from about 5 phr to about 10 phr, including 5 phr to 10 phr, including less than about 10 phr, including less than 10 phr, including less than about 5 phr, and including less than 5 phr.

Nano-Sized Inorganic Material

As discussed above, the rubber coating of the first-fourth embodiments comprises (includes) at least one nano-sized inorganic material having a dielectric constant of at least 9 and a loss tangent of less than 0.1. In certain embodiments of the first-fourth embodiments disclosed herein, the at least one nano-sized inorganic material has a dielectric constant of 9 to 2000. In certain embodiments of the first-fourth embodiments disclosed herein, the at least one nano-sized inorganic material has a dielectric constant of at least 20, including at least 25, at least 50, at least 100, at least 200, at least 500, at least 1000, or at least 1500. In certain embodiments of the first-fourth embodiments disclosed herein the at least one nano-sized inorganic material has a dielectric constant of about 20 to about 2000, including 20 to 2000, about 25 to about 2000, 25 to 2000, about 50 to about 2000, 50 to 2000, about 100 to about 2000, 100 to 2000, about 200 to about 2000, 200 to 2000, about 500 to about 2000, about 20 to about 1500, 20 to 1500, about 25 to about 1500, 25 to 1500, about 50 to about 1500, 50 to 1500, about 100 to about 1500, 100 to 1500, about 200 to about 1500, 200 to 1500, about 500 to about 1500, about 20 to about 1000, 20 to 1000, about 25 to about 1000, 25 to 1000, about 50 to about 1000, 50 to 1000, about 100 to about 1000, 100 to 1000, about 200 to about 1000, 200 to 1000, about 500 to about 1000, about 20 to about 500, 20 to 500, about 25 to about 500, 25 to 500, about 50 to about 500, 50 to 500, about 100 to about 500, 100 to 500, about 200 to about 500, or 200 to 500. In certain embodiments of the first-fourth embodiments, the at least one nano-sized inorganic material has a loss tangent of about 0.0001 to 0.1, including 0.0001 to 0.1, about 0.0001 to about 0.05, 0.0001 to 0.05, about 0.0001 to about 0.01, 0.0001 to 0.01, about 0.0002 to 0.1, 0.0002 to 0.1, about 0.0002 to about 0.05, 0.0002 to 0.05, about 0.0002 to about 0.01, 0.0002 to 0.01, about 0.0003 to 0.1, 0.0003 to 0.1, about 0.0003 to about 0.05, 0.0003 to 0.05, about 0.0003 to about 0.01, 0.0003 to 0.01, about 0.0004 to 0.1, 0.0004 to 0.1, about 0.0004 to about 0.05, 0.0004 to 0.05, about 0.0004 to about 0.01, 0.0004 to 0.01, about 0.0005 to 0.1, 0.0005 to 0.1, about 0.0005 to about 0.05, 0.0005 to 0.05, about 0.0005 to about 0.01, 0.0005 to 0.01, about 0.0006 to 0.1, 0.0006 to 0.1, about 0.0006 to about 0.05, 0.0006 to 0.05, about 0.0006 to about 0.01, 0.0006 to 0.01, about 0.0007 to 0.1, 0.0007 to 0.1, about 0.0007 to about 0.05, 0.0007 to 0.05, about 0.0007 to about 0.01, 0.0007 to 0.01, about 0.0008 to 0.1, 0.0008 to 0.1, about 0.0008 to about 0.05, 0.0008 to 0.05, about 0.0008 to about 0.01, 0.0008 to 0.01, about 0.0009 to 0.1, 0.0009 to 0.1, about 0.0009 to about 0.05, 0.0009 to 0.05, about 0.0009 to about 0.01, 0.0009 to 0.01, about 0.001 to 0.1, 0.001 to 0.1, about 0.001 to about 0.05, 0.001 to 0.05, about 0.001 to about 0.01, and 0.001 to 0.01. According to certain embodiments of the first-fourth embodiments disclosed herein, the at least one nano-sized inorganic material may have a loss tangent selected from one of the foregoing ranges combined with any of the dielectric constant ranges previously provided, or a dielectric constant selected from one of the foregoing ranges combined with any of the loss tangent ranges previously provided.

By stating that at least one nano-sized inorganic material may be utilized is meant that one or more than one (e.g., two, three, or more) nano-sized inorganic material may be utilized in the rubber coating of the first-fourth embodiments. If more than one nano-sized inorganic material is utilized, the dielectric constant and the loss tangent of each material falls within one of the foregoing parameters or ranges. Similarly, when more than one nano-sized inorganic material is utilized, each material should be understood to have properties falling within one of the following parameters or ranges (e.g., particle size).

The particular particle size of the nano-sized inorganic material used in the rubber coatings of the first-fourth embodiments may vary but as a nano-sized material will generally be 100 nm or less in at least one dimension, preferably at least two dimensions (e.g., two or three dimensions). In certain embodiments of the first-fourth embodiments, the nano-sized inorganic material has a particle size falling within the range of about 1 nm to about 100 nm, including 1 nm to 100 nm, about 1 nm to about 90 nm, 1 nm to 90 nm, about 1 nm to about 80 nm, 1 nm to 80 nm, about 1 nm to about 70 nm, 1 nm to 70 nm, about 1 nm to about 60 nm, 1 nm to 60 nm, about 1 nm to about 50 nm, 1 nm to 50 nm, about 1 nm to about 40 nm, 1 to 40 nm, about 1 to about 30 nm, 1 to 30 nm, about 1 to about 20 nm, 1 to 20 nm, about 1 to about 10 nm, 1 to 10 nm, about 10 nm to about 100 nm, 10 nm to 100 nm, about 10 nm to about 90 nm, 10 nm to 90 nm, about 10 to about 80 nm, 10 to 80 nm, about 10 to about 70 nm, 10 to 70 nm, about 10 to about 60 nm, 10 to 60 nm, about 10 to about 50 nm, 10 to 50 nm, about 10 to about 40 nm, 10 to 40 nm, about 10 to about 30 nm, 10 to 30 nm, about 10 to about 20 nm, or 10 to 20 nm; the foregoing particle size ranges may apply to one, two or three dimensions of the particles. The particle sizes referred to herein are intended to refer to average primary particle sizes, more specifically an average primary particle size such as can be determined using a dynamic light scattering method such as ASTM Method E2490 (most recently published as version −09 in 2015) by which an intensity averaged hydrodynamic particle size can be determined.

The particular composition of the at least one nano-sized inorganic material used in the rubber coatings of the first-fourth embodiments may vary. In certain embodiments of the first-fourth embodiments disclosed herein, the at least one nano-sized inorganic material contains at least one metal selected from alkaline earth metals or transition metals; in certain such embodiments, the at least one nano-sized inorganic material contains at least one metal selected from the group consisting of alkaline earth metals, transition metals, and combinations thereof. In certain embodiments of the first-fourth embodiments disclosed herein, the at least one nano-sized inorganic material contains at least one transition metal; in certain such embodiments, the at least one transition metal comprises a group 4 transition metal, a group 5 transition metal, a group 6 transition metal, or a combination thereof. The alkaline earth metals are generally understood to include beryllium, magnesium, calcium, strontium, barium and radium. The group 4 transition metals are generally understood to include titanium, zirconium, and hafnium. The group 5 transition metals are generally understood to include vanadium, niobium, and tantalum. The group 6 transition metals are generally understood to include cerium, molybdenum, and tungsten. In certain embodiments of the first-fourth embodiments disclosed herein, the at least one nano-sized inorganic material contains a metal selected from group 4 transition metals. In certain embodiments of the first-fourth embodiments disclosed herein, the at least one nano-sized inorganic material comprises titanium, e.g., a titanium compound such as titanium dioxide.

In certain embodiments of the first-fourth embodiments disclosed herein, the at least one nano-sized inorganic material is a metal oxide containing at least one metal selected from alkaline earth metals or transition metals; in certain such embodiments, the at least one nano-sized inorganic material contains at least one metal selected from the group consisting of alkaline earth metals, transition metals, and combinations thereof. In certain embodiments of the first-fourth embodiments disclosed herein, the at least one nano-sized inorganic material is a metal oxide containing at least one transition metal; in certain such embodiments, the at least one transition metal comprises a group 4 transition metal, a group 5 transition metal, a group 6 transition metal, or a combination thereof. In certain embodiments of the first-fourth embodiments disclosed herein, the at least one nano-sized inorganic material is a metal oxide containing a metal selected from group 4 transition metals. In certain embodiments of the first-fourth embodiments disclosed herein, the at least one nano-sized inorganic material is a titanium oxide. The term titanium oxide or titanium oxide compound is used to refer to a compound that contains both titanium and oxygen; in certain embodiments, the titanium oxide compound includes at least one additional element in addition to titanium and oxygen (e.g., strontium titanium oxide) and in other embodiments the titanium oxide compound includes only titanium and oxygen. Since titanium has more than one oxidation state, various forms of titanium oxides that include only titanium and oxygen exist including titanium dioxide (also known as titanium (IV) oxide or $TiO_2$); titanium oxide (also known as titanium (II) oxide, titanium monoxide or TiO); dititanium trioxide (also known as titanium (III) oxide or $Ti_2O_3$); trititanium oxide ($Ti_3O$); dititanium oxide ($Ti_2O$); and compounds having the formula $Ti_nO_{2n-1}$ where n is an integer selected from 3-9. In certain embodiments of the first-fourth embodiments disclosed herein, the at least one nano-sized inorganic material comprises titanium dioxide ($TiO_2$). Non-limiting examples of titanium oxide compounds that include titanium, oxygen and at least one other element are titanium aluminum oxide and lead titanium oxide.

In certain embodiments of the first-fourth embodiments disclosed herein, the nano-sized inorganic material is selected from the group consisting of titanium oxide compounds, titanium dioxide, strontium titanate, aluminum oxide, titanium aluminum oxide, magnesium oxide, magnesium titanate, barium strontium titanate, hafnium oxide, zirconium oxide, cerium oxide, tantalum oxide, barium titanate, and combinations thereof. Strontium titanate is also known as strontium titanium oxide and has the formula $SrTiO_3$. Aluminum oxide has the formula $Al_2O_3$. Titanium aluminum oxide has the formula $Al_2O_3 \cdot TiO_2$. Magnesium oxide has the formula MgO. Magnesium titanate is also known as magnesium titanium oxide and has the formula $Mg_2TiO_4$. Barium strontium titanate has the formula $BaO_4SrTi$. Hafnium oxide is also known as hafnium (IV) oxide and has the formula $HfO_2$. Zirconium oxide has the formula $ZrO_2$. Cerium oxide is also known as cerium (IV) oxide and has the formula $CeO_2$. Tantalum oxide is also known as tantalum (V) oxide and has the formula $Ta_2O_5$. Barium titanate has the formula $BaTiO_3$.

The amount of the at least one nano-sized inorganic material used in the rubber coatings of the first-fourth embodiments disclosed herein may vary. Amounts referred to herein are intended to refer to the total amount of all nano-sized inorganic materials used in the rubber coating unless stated to the contrary, e.g., if two (or more) nano-sized inorganic materials are used the amounts refer to the total amount of all such materials. In certain embodiments of the first-fourth embodiments, the at least one nano-sized inorganic material is present in the rubber coating in an amount of at least 20 phr. In certain embodiments of the first-fourth embodiments disclosed herein, the at least one nano-sized inorganic material is present in the rubber coating in an amount of up to 150 phr, up to 140 phr, up to 130 phr, up to 120 phr, up to 110 phr, or up to 100 phr. In certain embodiments of the first-fourth embodiments disclosed herein, the at least one nano-sized inorganic material is present in the rubber coating in an amount of 20 phr to about 100 phr, including 20 phr to 100 phr, about 25 phr to about 100 phr, 25 phr to 100 phr, about 30 phr to about 100 phr, 30 phr to 100 phr, about 35 phr to about 100 phr, 35 phr to 100 phr, about 40 phr to about 100 phr, 40 phr to 100 phr, about 45 phr to about 100 phr, 45 phr to 100 phr, about 50 phr to about 100 phr, 50 phr to 100 phr, 20 phr to about 90 phr, 20 phr to 90 phr, 20 phr to about 80 phr, 20 phr to 80 phr, 20 phr to about 70 phr, 20 phr to 70 phr, 20 phr to about 60 phr, or 20 phr to 60 phr. The foregoing amounts and ranges for the at least one nano-sized inorganic material should be understood to apply to all of the types of nano-sized inorganic materials, as discussed above.

Fillers

In certain embodiments of the first-fourth embodiments disclosed herein, the rubber coating includes (further comprises) at least one filler in addition to the at least one nano-sized inorganic material. (Discussions herein of a "reinforcing filler" and a "non-reinforcing filler" should be understood as referring to components other than (in addition to) the at least one nano-sized inorganic material.) In certain such embodiments, the at least one filler comprises at least one reinforcing filler, at least one non-reinforcing filler, or a combination thereof. In certain embodiments of the first-fourth embodiments disclosed herein, the rubber coating is free of (i.e., comprises 0 phr) of any reinforcing filler, free of (i.e., comprises 0 phr) of any non-reinforcing filler, or both. In certain embodiments of the first-fourth embodiments disclosed herein, the rubber coating includes (further comprises) no more than (i.e., up to) 5 phr of reinforcing carbon black filler. In certain embodiments of the first-fourth embodiments disclosed herein, the rubber coating is free of (i.e., comprises 0 phr) or essentially free of (i.e., comprises 5 phr or less) of reinforcing carbon black filler. In certain embodiments of the first-fourth embodiments disclosed herein, the rubber coating includes (further comprises) up to 120 phr of non-reinforcing carbon black filler; in other words, in such embodiments the rubber coating includes a non-reinforcing carbon black filler in an amount of up to 120 phr (e.g., 1-120 phr including up to 100 phr, up to 90 phr, up to 80 phr, up to 70 phr, up to 60 phr, up to 50 phr, up to 40 phr, up to 30 phr, up to 20 phr, up to 10 phr). In certain embodiments of the first-fourth embodiments disclosed herein, the rubber coating is free of (i.e., comprises 0 phr) of non-reinforcing carbon black filler. In certain embodiments of the first-fourth embodiments disclosed herein, the rubber coating includes (further comprises) no more than 5 phr of reinforcing carbon black and up to 120 phr of non-reinforcing carbon black. Non-limiting examples of non-reinforcing carbon blacks include, but are not limited to, thermal blacks or the N9 series carbon blacks (also referred to as the N-900 series), such as those with the ASTM designation N-907, N-908, N-990, and N-991. Various carbon blacks meeting the foregoing are commercially available, including but not limited to Thermax® N990 carbon black from Cancarb Limited (Medicine Hat, Alberta, Canada).

As used herein, the term "non-reinforcing filler" refers to a particulate material (other than the at least one nano-sized inorganic material) that has a nitrogen surface area of less than about 20 $m^2/g$ (including less than 20 $m^2/g$), and in certain embodiments less than about 10 $m^2/g$ (including less than 10 $m^2/g$). The nitrogen surface area of such a non-reinforcing filler particulate material can be determined according to various standard methods (including ASTM D6556 or D3037). In certain embodiments of the first-fourth embodiment disclosed herein, the term "non-reinforcing filler" is additionally or alternatively used to refer to a particulate material that has a particle size of greater than about 1000 nm (including greater than 1000 nm).

As used herein, the term "reinforcing" as used with respect to the phrases such as "reinforcing filler" and "reinforcing carbon black filler," generally should be understood to encompass both fillers that are traditionally described as reinforcing as well as fillers that may be described as semi-reinforcing. Traditionally, the term "reinforcing filler" is used to refer to a particulate material that has a nitrogen absorption specific surface area ($N_2SA$) of more than about 100 $m^2/g$, and in certain instances more than 100 $m^2/g$, more than about 125 $m^2/g$, more than 125 $m^2/g$, or even more than about 150 $m^2/g$ or more than 150 $m^2/g$. Alternatively, the traditional use of the term "reinforcing filler" can also be used to refer to a particulate material that has a particle size of about 10 nm to about 50 nm (including 10 nm to 50 nm). Traditionally, the term "semi-reinforcing filler" is used to refer to a filler that is intermediary in either particle size, surface area ($N_2SA$), or both, to a non-reinforcing filler and a reinforcing filler. In certain embodiments of the first-fourth embodiments disclosed herein, the term "reinforcing filler" is used to refer to a particulate material that has a nitrogen absorption specific surface area ($N_2SA$) of about 20 $m^2/g$ or greater, including 20 $m^2/g$ or greater, more than about 50 $m^2/g$, more than 50 $m^2/g$, more than about 100 $m^2/g$, more than 100 $m^2/g$, more than about 125 $m^2/g$, and more than 125 $m^2/g$. In certain embodiments of the first-fourth embodiments disclosed herein, the term "reinforcing filler" is additionally or alternatively used to refer to a particulate material that has a particle size of about 10 nm up to about 1000 nm, including 10 nm up to 1000 nm, about 10 nm up to about 50 nm, and 10 nm up to 50 nm.

In certain embodiments of the first-fourth embodiments disclosed herein, the rubber coating comprises no more than 100 phr of silica filler (reinforcing, non-reinforcing or either); in other words, in such embodiments, the rubber coating comprises silica filler in an amount of up to 100 phr. In certain embodiments of the first-fourth embodiments disclosed herein, the amount of silica filler in the rubber coating is more limited and comprises no more than 90 phr, no more than 80 phr, no more than 70 phr, no more than 60 phr, no more than 50 phr, no more than 40 phr, no more than 30 phr, no more than 20 phr, or no more than 10 phr of silica filler. In certain embodiments of the first-fourth embodiments disclosed herein, the rubber coating is free of (i.e., comprises 0 phr) of silica filler or is essentially free of silica filler (i.e., comprises 10 phr or less or 5 phr or less).

In certain embodiments of the first-fourth embodiments disclosed herein, the rubber coating comprises no more than 10 phr (in total) of any of the following non-reinforcing fillers: graphite, clay, non nano-sized titanium dioxide (i.e., having a particle size greater than 100 nm), magnesium dioxide, aluminum oxide, starch, boron nitride, silicon nitride, aluminum nitride, calcium silicate, or silicon carbide. In certain such embodiments of the first-fourth embodiments disclosed herein, the total amount of any of the foregoing non-reinforcing fillers is more limited such as less than 10 phr, 5 phr or less, less than 5 phr, less than 4 phr, less than 3 phr, less than 2 phr, less than 1 phr or even 0 phr.

Other Ingredients or Additives

In certain embodiments according to the first-fourth embodiments disclosed herein, the rubber coating includes (further comprises) one or more additional ingredients (in addition to the at least one diene-based elastomer and at least one nano-sized inorganic material as discussed above). Non-limiting examples of those additional ingredients are discussed below.

In certain embodiments according to the first-fourth embodiments disclosed herein, the rubber coating includes (further comprises) one or more process oils which may be useful in improving processability by reducing the Mooney viscosity of the rubber coating (e.g., before curing). In such embodiments, the one or more process oils may be added as a free oil to the rubber coating, as part of the at least one diene-based elastomer (i.e., as an extender oil), or as a combination of both. Non-limiting examples of oils useful in the rubber coatings according to certain embodiments of the first-fourth embodiments disclosed herein include paraffinic, naphthenic, aromatic process, and the like. Certain suitable oils, including the aforementioned oils, are low polycyclic aromatic content (low PCA) oils. Low PCA oils include those containing less than 3 weight %, less than 2 weight % or less than 1 weight % of polycyclic aromatic compounds (as measured by IP346). Commercially available low PCA oils include various naphthenic oils, mild extraction solvates (MES) and treated distillate aromatic extracts (TDAE), treated residual aromatic extract (TRAE), and heavy naphthenics. Suitable MES oils are available commercially as CATENEX SNR from SHELL, PROREX 15 and FLEXON 683 from EXXONMOBIL, VIVATEC 200 from BP, PLAXOLENE MS from TOTALFINAELF, TUDALEN 4160/4225 from DAHLEKE, MES-H from REPSOL, MES from Z8, and OLIO MES S201 from AGIP. Suitable TDAE oils are available as TYREX 20 from EXXONMOBIL, VIVATEC 500, VIVATEC 180 and ENERTHENE 1849 from BP, and EXTENSOIL 1996 from REPSOL. Suitable heavy naphthenic oils are available as SHELLFELX 794, ERGON BLACK OIL, ERGON H1000, CROSS C1000, CROSS C2400, and SAN JOAQUIN 1000L. Suitable low PCA oils also include various plant-sourced oils such as can be harvested from vegetables, nuts and seeds. Non-limiting examples include, but are not limited to, soy or soybean oil, sunflower oil, safflower oil, corn oil, linseed oil, cotton seed oil, rapeseed oil, cashew oil, sesame oil, camellia oil, jojoba oil, macadamia nut oil, coconut oil, and palm oil. In accordance with certain embodiments of the first-fourth embodiments disclosed herein, the rubber coating further comprises 0 (optional) to about 40 phr of one or more oils (process, extender, or both), including 0 to 40 phr, from about 1 to about 35 phr, 1 to 35 phr, about 5 to about 25, 5 to 25 phr, about 5 to about 20 phr, 5 to 20 phr, about 5 to about 15 phr, 5 to 15 phr, about 5 to about 10, or 5 to 10 phr of one or more oils such as those disclosed above.

In certain embodiments according to the first-fourth embodiments disclosed herein, the rubber coating may include other conventional rubber additives. These include, for example, oils, plasticizers, processing aids, waxes, anti-degradants such as antioxidants and anti-ozonants, tackifying resins, reinforcing resins, fatty acids, peptizers, zinc oxide, and the like; in certain embodiments of the first-fourth embodiments disclosed herein the rubber coating comprises at least one of the foregoing ingredients. Anti-degradants are ingredients added to protect the rubber from oxidative attack. ASTM D-4676 classifies rubber anti-degradants into six classes: p-phenylenediamines (PPDs), trimethyl-dihydroquinolines (TMQs), phenolics, alkylated diphenylamines (DPAs), aromatic phosphites, and diphenylamine-ketone condensates. Unless otherwise indicated herein, suitable amounts of such components can be determined by one skilled in the art.

In certain embodiments of the first-fourth embodiments disclosed herein, the rubber coating includes (further comprises) a cure package. Generally, the cure package includes at least one of: a vulcanizing agent, a vulcanizing accelerator, a vulcanizing activator (e.g., zinc oxide, stearic acid, and the like), a vulcanizing inhibitor, and an anti-scorching agent. In certain embodiments of the first-fourth embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in the rubber coatings according to certain of the first-fourth embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide or sulfur olefin adducts; and insoluble polymeric sulfur. Preferably, the sulfur vulcanizing agent is insoluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, which is incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in the rubber coatings according to certain of the first-fourth embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Mixing

The rubber coating according to the first-fourth embodiments may generally be prepared by mixing the ingredients together by methods known in the art, such as, for example, by kneading the ingredients together in a Banbury mixer or on a milled roll. The preparation generally includes at least one non-productive master-batch mixing stage and a final productive mixing stage. In certain embodiments, the non-productive stage includes a re-mill stage. Non-productive master-batch and re-mill stages are known to those of skill in the art and generally understood to be a mixing stage where no vulcanizing agents or vulcanization accelerators are added. The final productive mixing stage is also known to those of skill in the art and generally understood to be a mixing stage where the vulcanizing agents and vulcanization accelerators are added into the rubber coating. As used herein, the term "final batch" refers to the productive mixing stage itself, or to the rubber formulation present in this stage, in which the vulcanizing agents and vulcanization accelerators are added into the rubber coating.

The master-batch mixing stage may be conducted at a temperature of about 80° C. to about 200° C. (including 80° C. to about 200° C. The separate re-mill stage often is performed at temperatures similar to, although often slightly lower than, those employed in the master-batch stage, e.g., ramping from about 90° C. (including 90° C.) to a drop temperature of about 150° C. (including 150° C.). For purposes of this application, the term "master-batch" means the composition that is present during the master-batch stage or the composition as it exists during the re-mill stage, or both. The final, productive mixing stage, in which the curatives are charged, e.g., the vulcanizing agents and vulcanization accelerators, often is conducted at lower temperatures, e.g., starting at about 50° C. to about 65° C. (including 50° C. to 65° C.) and not going higher than about 100° C. to about 130° C. (including 100° C. to 130° C.).

Tires and Tire Components

As discussed above, the electronic communication module according to the second embodiment disclosed herein is for a tire (including a tire retread) or is suitable for use in a tire (including a tire retread) and can be incorporated into the tire (or tire retread). The third embodiment disclosed herein is directed to a tire or tire retread comprising (or incorporating) the electronic communication module of the second embodiment. As discussed above, the rubber coating for an electronic communication module disclosed in the first embodiment can be considered suitable for use as a rubber coating for an electronic communication module for a tire wherein the electronic communication module includes a radio device having at least a portion of its outer surface surrounded by the rubber coating of the first embodiment. As used herein, the term "incorporated" or "incorporated into" is meant to include not only embedding or inserting into the interior portion of the tire or tire retread, but also associating with the tire or tire retread in other ways such as by the use of a patch. In certain embodiments according to the present disclosure, the patch that is used to associate the electronic communication module with the tire or tire retread is comprised of (has the composition of) the rubber coating disclosed herein. As discussed above, the third embodiment of the present disclosure is directed to the tire or tire retread comprising the electronic communication module of the second embodiment. In other words, the third embodiment is directed to a tire or tire retread having incorporated therein an electronic communication module with a radio device having at least a portion of its outer surface surrounded by a rubber coating according to the first embodiment disclosed herein. The fourth embodiment disclosed herein is directed to a method for increasing the dielectric constant of a rubber coating without increasing its loss tangent and in certain embodiments can be understood as relating to a rubber coating of an electronic communication module for a tire or tire retread wherein the electronic communication module includes a ratio device having at least a portion of its outer surface surrounded by the rubber coating of the first embodiment.

In accordance with certain embodiments of the second-fourth embodiments, the rubber coating surrounding at least a portion of the outer surface of the radio device in the electronic communication module is cured (vulcanized) prior to incorporation of the electronic communication module into the tire or tire component. According to such embodiments, the electronic communication module comprising the cured rubber coating may be inserted, embedded, or otherwise incorporated into the uncured tire or tire component. It should be understood that in the case of a tire retread, the electronic communication module comprising the cured rubber coating may be inserted, embedded, or otherwise incorporated into the new tread prior to curing the new tread, prior to applying the new tread to the reused tire casing, or prior to both. In accordance with these embodiments, the tire, tire retread or tire with the new retread is then cured with the electronic communication module incorporated therein.

Alternatively, when the rubber coating surrounding at least a portion of the outer surface of the radio device in the electronic communication module is cured prior to its incorporation into the tire or tire component, the electronic communication module may be adhered to the cured rubber coating of the tire or tire component using a patch, a suitable adhesive, or a cement capable of withstanding the operating conditions of a tire. As well, as discussed above, in certain embodiments, the patch itself comprises the rubber coating that surrounds at least a portion of the outer surface of the radio device. In certain embodiments, the electronic communication module can be adhered to the tire or tire component in the manner discussed in U.S. Pat. No. 5,971,046, which is incorporated herein by reference.

Furthermore, the rubber coating surrounding at least a portion of the outer surface of the radio device in the electronic communication module may be incorporated into the tire or tire retread prior to curing the rubber coating (composition) of the electronic communication module. In such embodiments, the electronic communication module comprising the uncured rubber coating (i.e., surrounding at least a portion of the outer surface of the radio device) is incorporated into the desired location of a tire or tire tread. The uncured rubber coating of the electronic module according to the first-fourth embodiments is then cured simultaneously along with the tire or tire tread.

Generally, when the rubber coatings disclosed herein are utilized in tires or tire retreads, these compositions are incorporated into a tire or tire retread according to ordinary tire manufacturing techniques including standard rubber shaping, molding, and curing techniques. In accordance with certain of the first-fourth embodiments, the electronic communication module may be incorporated into a tire retread or various components of a tire (e.g., tread, sidewall, belt skim, or carcass). In certain embodiments, tires as disclosed herein can be produced as discussed in U.S. Pat. Nos. 5,866,171; 5,876,527; 5,931,211; and 5,971,046, which are incorporated herein by reference.

Electronic Communication Module

As discussed above, in accordance with the second and third embodiments and in certain embodiments of the fourth embodiment disclosed herein, the radio device of the electronic communication module has at least a portion of its outer surface surrounded by the rubber coating. In certain embodiments of the second-fourth embodiments disclosed herein, the radio device of the electronic communication module has an antenna and a majority of the outer surface of the antenna is surrounded by the rubber coating; in yet other embodiments of the second-fourth embodiments disclosed herein the outer surface of the antenna of the electronic communication devices is entirely surrounded by the rubber coating. In certain embodiments of the second-fourth embodiments disclosed herein, the portion of the outer surface of the radio device of the electronic communication module that is surrounded by the rubber coating comprises at least 10%, at least 20%, at least 30%, at least 40%, at least 50%, at least 60%, at least 70%, at least 80%, at least 90%, at least 95% and 100%; in such embodiments the foregoing includes the ranges 10-50%, 10-60%, 10-70%, 10-80%, 10-90%, 10-95%, 10-100%, 20-50%, 20-60%, 20-70%, 20-80%, 20-90%, 20-95%, 20-100%, 30-50%, 30-60%, 30-70%, 30-80%, 30-90%, 30-95%, 30-100%, 40-50%, 40-60%, 40-70%, 40-80%, 40-90%, 40-95%, 40-100%, 50-60%, 50-70%, 50-80%, 50-90%, 50-95%, 50-100%, 60-70%, 60-80%, 60-90%, 60-95%, 60-100%, 70-80%, 70-90%, 70-95%, 70-100%, 80-90%, 80-95%, 80-100%, 90-95%, 90-100%, and 95-100%. In certain embodiments of the second-fourth embodiments disclosed herein, the radio device of the electronic communication module has a majority of its outer surface surrounded by the rubber coating. The phrase "a majority" as used herein refers to greater than 50% and should be understood to encompass up to 100%. Thus, in accordance with certain of the second-fourth embodiments, 51-100%, 51-99%, 51-95%, 51-90%, 51-80%, 51-70%, 51-60%, 60-100%, 60-99%, 60-90%, 60-80%, 60-70%, 70-100%, 70-99%, 70-95%, 70-90%, 70-80%, 80-100%, 80-99%, 80-95%, 80-90%, 90-100%, 90-99%, or 90-95% of the outer surface of the radio device is surrounded by the rubber coating. In certain embodiments of the second-fourth embodiments, the rubber coating of the electronic communication module is in direct contact with the outer surface of the radio device. In other embodiments of the first-fourth embodiments, one or more coatings, films, or other materials may form an intermediate layer disposed between the outer surface of the radio device and the rubber coating. Such intermediate layers may be used, for example, as a sizing or primer to improve adhesion of the outer surface of the radio device and the rubber coating. The selection and application of such an intermediate layer could be determined by one of ordinary skill in the art.

The rubber coating that surrounds at least a portion of the outer surface of the radio device may be placed upon the radio device using various methods. In certain embodiments, the rubber coating is placed upon the radio device as rubber sheets or layers. More specifically, in such embodiments, the rubber coating is calendered or otherwise formed into an uncured sheet of rubber having a uniform thickness (such as discussed above, e.g., no more than 4 mm or about 1 mm to about 4 mm). The radio device is placed onto the upper surface of the rubber sheet with a portion of the lower surface of the radio device contacting the rubber sheet. A second rubber sheet (generally having the same thickness as the first sheet) is placed over the upper surface of the radio device so that at least a portion of the outer surface of the radio device is covered by the two rubber layers. The two rubber layers are then pressed together to promote adhesion of first rubber layer to the second rubber layer with the radio device substantially captured between. Adhesion of the two rubber layers may be assisted by various means such as by using a dual roller assembly to press the components together and expel any trapped air, by stitching the layers together (such as by using a stitching roller), by manual finger pressure, by use of an inflatable bladder, by use of a compression molding fixture, or by any other means suitable for assisting in the adhesion of the two rubber layers. As discussed elsewhere herein, once the radio device has had at least a portion of its outer surface surrounded by the rubber coating, it is referred to as an electronic communication module.

Radio Device

In accordance with the second and third embodiments disclosed herein, the electronic communication module includes a radio device. Moreover, in accordance with certain embodiments of the first and fourth embodiments disclosed herein, the rubber coating is suitable for or utilized with an electronic communication device that includes a radio device wherein the rubber coating surrounds at least a portion of the outer surface of the radio device. The radio device includes any suitable radio device known in the art capable of storing information (i.e., data), communicating information, or both storing and communicating information with another device. In certain embodiments of the first-fourth, the radio device disclosed herein is capable of conveying information. The conveying of information by the radio device comprises the receipt of a radio signal combined with transponding (by reflecting) a portion of the received radio signal back to a reader with a signal modulated by varying the radio device's antenna impedance. Generally, such a radio device which conveys information by transponding in response to being activated by energy (e.g., electromagnetic waves) sent by an external, remote transponder (e.g., an interrogator-type or reader-type of transponder) is considered a passive device. In certain embodiments, the radio device disclosed herein is capable of actively transmitting information; such a radio device is an active device because it can actively transmit information. Certain such active devices transmit without the need for any activation by an external, remote transponder (e.g., at periodic intervals) and other such active devices actively transmit information in response to an appropriate activation received from an external, remote transponder. In certain embodiments of the first-fourth embodiments disclosed herein, the radio device conveys or transmits information via electromagnetic radio waves having a frequency in the range that is allowable according to local regulations. For example, in the United States, this frequency generally ranges from about 900 MHz to about 930 MHz (including 900 MHz to 930 MHz) (the current approved range being 902-928 MHz at a power level not to exceed 36 dbm) and in portions of Europe and Asia may be at a somewhat lower frequency of about 860 MHz (including 860 Mz) (the current approved range in portions of Europe is 865.6-867.6 MHz at a power level not to exceed 33 dBm). Generally, the radio devices discussed herein will be designed to convey or transmit information at a frequency ranging from about 860 MHz to about 960 MHz (including 860 MHz to 960 MHz). However, in certain embodiments of the first-fourth embodiments disclosed herein, the radio devices discussed herein may be designed to convey or transmit information at another frequency range. Examples of suitable radio devices for use with the electronic communication modules disclosed herein include transponders (e.g., devices that both receive information and transpond at least a portion of it), transmitters, receivers, and reflectors. Generally, the radio device is configured to convey or transmit information to/from an external, remote communication device, which itself may be a transponder, transmitter, receiver, or reflector depending on the functionality of the radio device of the electronic communication module of the first-fourth embodiments that it is communicating with (e.g., if the remote communication device is a transmitter, the electronic communication module's radio device is a transponder, receiver, or reflector capable of interacting with the electromagnetic waves sent from the transmitter). As used herein, the term "radio device" is inclusive of any and all of the components necessary to operate as a transponder, transmitter, receiver, or reflector, e.g., a circuit board, memory, antenna, etc.

The types of radio devices useful in the certain embodiments of the first-fourth embodiments disclosed herein include radio identification or tracking devices which may contain unique identifier information associated with the tire such that may be used in one or more of manufacturing, distribution, sale, and use activities associated with the tire. A specific example of a use activity includes information added during the use of a tire, such as could be added during retreading. A specific example of such identification or tracking device is a radio frequency identification device, more commonly referred to as an "RFID" device. In accordance with certain of the first-fourth embodiments, the radio device is an RFID device. Other examples of the radio devices include radio monitoring devices capable of measuring and/or storing temperature, pressure or other physical parameters associated with an operating tire. Other examples of suitable radio devices include those with both identification and monitoring functionality.

Methods for Increasing Dielectric Constant without Increasing Loss Tangent

As discussed above, the fourth embodiment disclosed herein is directed to a method for increasing the dielectric constant of a rubber coating without increasing its loss tangent; the increase in dielectric constant without an increase in loss tangent can be as compared to the dielectric constant of a rubber coating lacking the at least one nano-sized inorganic material but having an equivalent amount of silica filler instead. The method comprises incorporating at least one nano-sized inorganic material having a dielectric constant of at least 9 and a loss tangent of less than 0.1 into 100 phr of at least one diene-based elastomer such that the resulting rubber coating when cured has a dielectric constant of at least 4.5 and a loss tangent of less than 0.01; in certain sub-embodiments of the method, the at least one nano-sized inorganic material has a dielectric constant and a loss tangent as discussed above. The amounts and details concerning the at least one nano-sized inorganic material as well as the at least one diene-based elastomer for the fourth embodiment are as discussed above. In certain embodiments of the fourth embodiment, the method can be understood as a method directed to a rubber coating used with a radio device thereby resulting in an electronic communication module such as is suitable for use in a tire or tire retread and/or is incorporated into a tire or tire retread, e.g., where the rubber coating surrounds at least a portion of the outer surface of the radio device.

In certain embodiments of the fourth embodiment, the dielectric constant of the rubber coating is increased by at least 5%, at least 10%, at least 20% or more, as compared to the dielectric constant of a rubber coating lacking the at least one nano-sized inorganic material but having an equivalent amount of silica filler instead. In certain embodiments of the fourth embodiment, the dielectric constant of the rubber coating is increased by up to 100% (or more), up to 90%, up to 80%, up to 70%, up to 60%, up to 50%, up to 40%, up to 30%, or up to 25%. In certain embodiments of the fourth embodiment, the dielectric constant of the rubber coating is increased by one of the foregoing amounts and the loss tangent decreases; according to such embodiments, the decrease in loss tangent may be at least 5%, at least 10%, at least 20%, at least 30%, at least 40%, at least 50% less. The foregoing increases and decreases are as compared to the dielectric constant of a rubber coating lacking the at least one nano-sized inorganic material but having an equivalent amount of silica filler instead. An increase in the dielectric constant of the rubber coating without increasing loss tangent may allow for a decrease in antenna length for an electronic communication module which comprises a radio device with an antenna wherein at least a portion of the outer surface of the radio device is surrounded by the rubber coating. A shorter antenna can reduce the overall dimensions of an electronic communication module, thereby allowing for easier incorporation into a tire or tire tread. In certain embodiments of the fourth embodiment, as well as in certain embodiments of the second and third embodiments disclosed herein, the antenna length (i.e., the antenna of an electronic communication module which comprises a radio device with an antenna wherein at least a portion of the outer surface of the radio device is surrounded by the rubber coating) is no more than 150 mm, no more than 140 mm, no more than 130 mm, no more than 120 mm, no more than 110 mm, no more than 100 mm, no more than 90 mm, no more than 80 mm, no more than 70 mm, no more than 60 mm, or no more than 50 mm. In certain embodiments of the fourth embodiment, as well as in certain embodiments of the second and third embodiments disclosed herein, the antenna length (i.e., the antenna of an electronic communication module which comprises a radio device with an antenna wherein at least a portion of the outer surface of the radio device is surrounded by the rubber coating) has a length of about 15 mm to about 150 mm, 15 mm to 150 mm, about 20 mm to about 150 mm, 20 mm to 150 mm, 25 mm to about 150 mm, 25 mm to 150 mm, about 30 mm to about 150 mm, 30 mm to 150 mm, about 35 mm to about 150 mm, 35 mm to 150 mm, about 40 mm to about 150 mm, 40 mm to 150 mm, about 45 mm to about 150 mm, 45 mm to 150 mm, about 50 mm to about 150 mm, 50 mm to 150 mm, about 15 mm to about 140 mm, 15 mm to 140 mm, about 20 mm to about 140 mm, 20 mm to 140 mm, about 25 mm to about 140 mm, 25 mm to 140 mm, about 30 mm to about 140 mm, 30 mm to 140 mm, about 35 mm to about 140 mm, 35 mm to 140 mm, about 40 mm to about 140 mm, 40 mm to 140 mm, about 45 mm to about 140 mm, 45 mm to 140 mm, about 50 mm to about 140 mm, 50 mm to 140 mm, about 15 mm to about 130 mm, 15 mm to 130 mm, about 20 mm to about 130 mm, 20 mm to 130 mm, about 25 mm to about 130 mm, 25 mm to 130 mm, about 30 mm to about 130 mm, 30 mm to 130 mm, about 35 mm to about 130 mm, 35 mm to 130 mm, about 40 mm to about 130 mm, 40 mm to 130 mm, about 45 mm to about 130 mm, 45 mm to 130 mm, about 50 mm to about 130 mm, 50 mm to 130 mm, about 15 mm to about 120 mm, 15 mm to 120 mm, about 20 mm to about 120 mm, 20 mm to 120 mm, about 25 mm to about 120 mm, 25 mm to 120 mm, about 30 mm to about 120 mm, 30 mm to 120 mm, about 35 mm to about 120 mm, 35 mm to 120 mm, about 40 mm to about 120 mm, 40 mm to 120 mm, about 45 mm to about 120 mm, 45 mm to 120 mm, about 50 mm to about 120 mm, 50 mm to 120 mm, about 15 mm to about 110 mm, 15 mm to 110 mm, about 20 mm to about 110 mm, 20 mm to 110 mm, about 25 mm to about 110 mm, 25 mm to 110 mm, about 30 mm to about 110 mm, 30 mm to 110 mm, about 35 mm to about 110 mm, 35 mm to 110 mm, about 40 mm to about 110 mm, 40 mm to 110 mm, about 45 mm to about 110 mm, 45 mm to 110 mm, about 50 mm to about 110 mm, 50 mm to 110 mm, about 15 mm to about 100 mm, 15 mm to 100 mm, about 20 mm to about 100 mm, 20 mm to 100 mm, about 25 mm to about 100 mm, 25 mm to 100 mm, about 30 mm to about 100 mm, 30 mm to 100 mm, about 35 mm to about 100 mm, 35 mm to 100 mm, about 40 mm to about 100 mm, 40 mm to 100 mm, about 45 mm to about 100 mm, 45 mm to 100 mm, about 50 mm to about 100 mm, 50 mm to 100 mm.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, the diene-based elastomers, non-reinforcing carbon black, and other ingredients (e.g., curative package ingredients) utilized in the following examples should not be interpreted as limiting since other or additional ingredients consistent with the disclosure in the Detailed Description can be utilized in substitution. In other words, the particular nano-sized inorganic material and its amount in the following examples should be understood to apply to the more general content of the Detailed Description. As well, the use of 70 phr of natural rubber, 30 phr of polybutadiene, 5 phr of naphthenic oil, and the other ingredients (e.g., cure package ingredients, phenolic resin) should not in any way be interpreted as requiring the presence of these particular in the rubber composition for the rubber coatings disclosed herein.

The rubber compositions of Examples 1 and 2 were prepared according to the formulations shown in Table 1, using the mixing procedure shown in Table 2. All ingredients in Table 1 are listed in phr. Example 1 is a control composition containing 50 phr of reinforcing silica filler rather than 50 phr of nano-sized titanium dioxide. The titanium dioxide used in Example 2 was obtained from Sigma-Aldrich (and was described as having a particle size of less than 25 nm, as determined by laser particle size analysis). The rubber compositions were cured at 170° C. for 15 minutes. After calendaring to approximately 2 mm thickness, followed by curing, a 30 mm×30 mm×2 mm sample of each rubber composition was taken. The dielectric constant at 915 MHz was measured for each cured rubber sample using a RF Impedance/Material Analyzer from Agilent Technologies (model E4991A with dielectric material test fixture 16453A). This analyzer utilizes the parallel plate method for measuring permittivity in accordance with ASTM method D110. (Operating manuals, data sheets and other related information for measurement of permittivity using the E4991A RF Impedance/Material Analyzer are available with the instrument and also on-line at www.keysight.com, with Keysight Technologies now selling Agilent brand electronic measurement instrument). The dielectric constant values are reported in Table 1 below. It should be understood that the dielectric constants (i.e., relative permittivity) of rubber coatings according to the present disclosure can be measured using different instruments, although generally measurements taken using parallel plate methods in accordance with ASTM D110 are preferred.

TABLE 1

| Example # | 1 | 2 |
|---|---|---|
| Natural Rubber | 70 | 70 |
| Polybutadiene | 30 | 30 |
| Nano-sized titanium dioxide | 0 | 50 |
| N990 Carbon black filler w/ Nitrogen surface area = 8 m$^2$/g (D3037) DBP Absorption = 43 cm$^3$/100 g (D2024) | 35 | 35 |
| Silica filler | 50 | 0 |
| Silane | 6 | 6 |
| Naphthenic oil (phr) | 5 | 5 |
| Activators | 7 | 7 |
| Antidegradant | 5 | 5 |
| Antioxidant | 2 | 2 |
| Phenolic resin | 5 | 5 |
| Silane | 6 | 6 |
| Final Batch | | |
| Vulcanizing agent | 2.5 | 2.5 |
| Antidegradant | 3 | 3 |
| Vulcanizing accelerator | 1 | 1 |
| Thickness | 2.17 | 2.06 |
| Dielectric Constant at 915 MHz | 4.07 | 4.88 |
| Loss tangent | 0.018 | 0.0094 |

As can be seen from the data of Table 1, the use of 50 phr of nano-sized titanium dioxide in Example 2 in place of the 50 phr of reinforcing silica filler used in control Example 1 increased the dielectric constant by just over 20%. The increase in dielectric constant was achieved without increasing the loss tangent, which instead was decreased by about 45%. As discussed above, an increase in the dielectric constant of a rubber coating without an increase in loss tangent may allow for a decrease in antenna length for an electronic communication module which comprises a radio device with an antenna wherein at least a portion of the outer surface of the radio device is surrounded by the rubber coating.

TABLE 2

| Mixing Parameters | | |
|---|---|---|
| Stage | Time | Condition |
| Master-Batch Stage (initial temperature 105° C., rotor 60 rpm) | 0 seconds | Charge elastomer |
| | 30 seconds | Charge filler and other master-batch ingredients |
| | 120 seconds | Clean ram |
| | 165 seconds | Drop based on time or max temperature of 160° C. |
| Final Batch Stage (initial temperature 50° C., rotor rpm at 40) | 0 seconds | Charge Master Batch |
| | 0 seconds | Charge final batch ingredients |
| | 60 seconds | Clean ram |
| | 120 seconds | Drop based on time or max temperature of 105° C. |

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the application, in its broader aspects, is not limited to the specific details and embodiments described. Accordingly, departures may be made from such details without departing from the spirit or scope of the applicant's general inventive concept.

This application discloses several numerical range limitations that support any range within the disclosed numerical ranges even though a precise range limitation is not stated verbatim in the specification because the embodiments could be practiced throughout the disclosed numerical ranges. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

What is claimed is:

1. An electronic communication module for a tire comprising a radio device having at least a portion of its outer surface surrounded by a rubber coating, the coating comprising:
   (a) 100 parts of at least one diene-based elastomer;
   (b) about 20 to about 100 parts per hundred parts of the at least one diene elastomer of at least one nano-sized inorganic material having a dielectric constant of at least 9 and a loss tangent of less than 0.1; and
   no more than 5 parts per hundred parts of the at least one diener elastomer of reinforcing carbon black having a particle size of 10 nm to 1000 nm.
   wherein the coating when cured has a dielectric constant of at least 4.5 and a loss tangent of less than 0.01.

2. The electronic communication module of claim 1, wherein the nano-sized inorganic material contains a metal selected from the group consisting of alkaline earth metals, transition metals, and combinations thereof.

3. The electronic communication module of claim 1, wherein the nano-sized inorganic material comprises a metal oxide and the metal of the metal oxide is selected from the group consisting of alkaline earth metals, transition metals, and combinations thereof.

4. The electronic communication module claim 1, wherein the nano-sized inorganic material is selected from the group consisting of titanium oxide compounds, titanium dioxide, strontium titanate, aluminum oxide, titanium aluminum oxide, magnesium oxide, magnesium titanate, barium strontium titanate, hafnium oxide, zirconium oxide, cerium oxide, tantalum oxide, barium titanate, and combinations thereof.

5. The electronic communication module of claim 1, wherein the nano-sized inorganic material comprises titanium dioxide.

6. The electronic communication module of claim 1, wherein the at least one nano-sized inorganic material is present in an amount of about 40 to about 90 parts per hundred parts of the at least one diene based elastomer.

7. The electronic communication module of claim 1, wherein the nano-sized inorganic material has a particle size of 100 nanometers or less in at least two dimensions.

8. The electronic communication module of claim 1, wherein the coating contains 1 to 120 parts per hundred parts of the at least one diene based elastomer of non-reinforcing carbon black.

9. The electronic communication module of claim 1, wherein the coating contains 1-120 parts per hundred parts of the at least one diene based elastomer of non-reinforcing carbon black.

10. The electronic communication module of claim 1 having a thickness of no more than 4 mm.

11. The electronic communication module of claim 1, wherein the radio device includes an antenna with an outer surface and having a length of no more than 110 mm, and a majority of the outer surface of the antenna is covered by the rubber coating.

12. A tire or tire retread comprising the electronic communication module of claim 11.

13. A method for increasing the dielectric constant of a rubber coating for an electronic communication module for a tire comprising a radio device having at least a portion of its outer surface surrounded by the rubber composition without increasing its loss tangent, the method comprising
   incorporating at least one nano-sized inorganic material having a dielectric constant of at least 9 and a loss tangent of less than 0.1 into 100 parts of at least one diene-based elastomer, wherein about 20 to about 100 parts per hundred parts of the at least one diene elastomer are incorporated and no more than 5 parts per hundred parts of the at least one diene elastomer of reinforcing carbon black having a particle size of 10 nm up to 1000 nm are incorporated, such that the resulting rubber coating for the electronic communication module for a tire when cured has a dielectric constant of at least 4.5 and a loss tangent of less than 0.01.

14. The method of claim 13, wherein the at least one nano-sized inorganic material is present in an amount of about 40 to about 90 parts per hundred parts of the at least one diene based elastomer.

15. The method of claim 13, wherein the nano-sized inorganic material comprises titanium dioxide.

16. The method of claim 13, wherein the coating contains 1-120 parts per hundred parts of the at least one diene based elastomer of non-reinforcing carbon black.

17. The method of claim 13, wherein the at least one nano-sized inorganic material meets at least one of the following:
   (a) contains a metal selected from the group consisting of alkaline earth metals, transition metals, and combinations thereof;
   (b) comprises a metal oxide wherein the metal of the metal oxide is selected group the group consisting of alkaline earth metals, transition metals, and combinations thereof; or
   (c) is selected from the group consisting of titanium oxide compounds, titanium dioxide, strontium titanate, aluminum oxide, titanium aluminum oxide, magnesium oxide, magnesium titanate, barium strontium titanate, hafnium oxide, zirconium oxide, cerium oxide, tantalum oxide, barium titanate, and combinations thereof.

18. The method of claim 13, wherein the rubber coating has a thickness of no more than 4 mm.

19. The method of claim 18, wherein the nano-sized inorganic material comprises titanium dioxide.

20. An electronic communication module for a tire comprising a radio device having at least a portion of its outer surface surrounded by a rubber coating, the coating comprising:
- (a) 100 parts of at least one diene-based elastomer selected from the group consisting of styrene-butadiene rubber, polybutadiene, natural rubber, polyisoprene, and combinations thereof;
- (b) about 20 to about 100 parts per hundred parts of the at least one diene elastomer of at least one nano-sized inorganic material selected from the group consisting of titanium oxide compounds, titanium dioxide, strontium titanate, aluminum oxide, titanium aluminum oxide, magnesium oxide, magnesium titanate, barium strontium titanate, hafnium oxide, zirconium oxide, cerium oxide, tantalum oxide, barium titanate, and combinations thereof and having a dielectric constant of at least 9 and a loss tangent of less than 0.1; and no more than 5 parts per hundred parts of the at least one diene elastomer of reinforcing carbon black having a particle size of 10 nm up to 1000 nm and no more than 10 parts per hundred parts of the at least one diene elastomer of silica filler, wherein the coating has a thickness of no more than 4 mm and when cured has a dielectric constant of at least 4.5 and a loss tangent of less than 0.01.

\* \* \* \* \*